United States Patent
Ochiai

(10) Patent No.: US 7,593,038 B2
(45) Date of Patent: Sep. 22, 2009

(54) CAMERA ENABLING PANNING AND MOVING PICTURE EDITING PROGRAM PRODUCT

(75) Inventor: Toru Ochiai, Kashiwa (JP)

(73) Assignee: Nikon Corporation, Tokyo (JP)

(\*) Notice: Subject to any disclaimer, the term of this patent is extended or adjusted under 35 U.S.C. 154(b) by 616 days.

(21) Appl. No.: 11/246,396

(22) Filed: Oct. 11, 2005

(65) Prior Publication Data

US 2006/0082656 A1 Apr. 20, 2006

(30) Foreign Application Priority Data

Oct. 15, 2004 (JP) .............................. 2004-301932

(51) Int. Cl.
*H04N 5/228* (2006.01)

(52) U.S. Cl. ............... 348/208.6; 348/222.1; 348/240.2

(58) Field of Classification Search ... 348/208.1–208.6, 348/208.99, 221.1, 240.99, 240.2
See application file for complete search history.

(56) References Cited

U.S. PATENT DOCUMENTS

| | | | |
|---|---|---|---|
| 5,416,557 A | | 5/1995 | Nagasaki et al. |
| 5,526,045 A | \* | 6/1996 | Oshima et al. ............ 348/208.5 |
| 2002/0039138 A1 | \* | 4/2002 | Edelson et al. .............. 348/208 |
| 2006/0017814 A1 | \* | 1/2006 | Pinto et al. ................ 348/208.4 |
| 2006/0017817 A1 | \* | 1/2006 | Okubo ................... 348/208.99 |
| 2006/0087563 A1 | \* | 4/2006 | Duan ..................... 348/208.99 |

FOREIGN PATENT DOCUMENTS

| | | |
|---|---|---|
| JP | 02-023789 | 1/1990 |
| JP | H04-85973 U | 7/1992 |
| JP | H04-245782 A | 9/1992 |
| JP | A 05-061091 | 3/1993 |
| JP | A 05-134284 | 5/1993 |
| JP | A 07-226873 | 8/1995 |
| JP | H08-223481 A | 8/1996 |
| JP | A-10-191149 | 7/1998 |
| JP | 2000-217028 A | 8/2000 |
| JP | A 2000-261657 | 9/2000 |
| JP | A 2001-339712 | 12/2001 |
| JP | A 2001-359089 | 12/2001 |
| JP | 2003-198902 A | 7/2003 |
| JP | 2004-007106 A | 1/2004 |
| JP | 2004-260369 A | 9/2004 |

\* cited by examiner

*Primary Examiner*—Lin Ye
*Assistant Examiner*—Gevell Selby
(74) *Attorney, Agent, or Firm*—Oliff & Berridge, PLC

(57) ABSTRACT

A camera with which a moving picture can be taken by panning the camera, includes: a detection unit that detects actual camera panning speed characteristics; a calculation unit that calculates a speed characteristics difference between the actual panning speed characteristics and reference panning speed characteristics set in advance; and a correction unit that executes correction so as to adjust panning speed characteristics of a moving picture to be obtained closer to the reference panning speed characteristics based upon the speed characteristics difference having been calculated.

13 Claims, 11 Drawing Sheets

IDEAL CHARACTERISTICS t0 t1 t2 t3 t4

ACTUAL CHARACTERISTICS t0 t1 t2 t3 t4

CAMERA ENABLING PANNING AND MOVING PICTURE EDITING PROGRAM PRODUCT

INCORPORATION BY REFERENCE

The disclosure of the following priority application is herein incorporated by reference:

Japanese Patent Application No. 2004-301932 filed Oct. 15, 2004

BACKGROUND OF THE INVENTION

1. Field of the Invention

The present invention relates to a camera with which moving pictures can be taken, such as a video camera or a digital still camera enabling a moving picture photographing operation that allows a panning operation.

2. Description of the Related Art

The term "panning" is used to refer to photographing an image over a wide range by moving the camera during the photographing operation, to the left/right, along the upward/downward direction or the like. Such a panning operation is executed either manually or by using a motor-driven pan head.

When panning the camera held by hand without fixing it to a tripod or the like, the speed and acceleration with which the camera moves are determined by the manner with which the user moves his hands and arms and, for this reason, the speed and acceleration tend to change irregularly, which makes it difficult to obtain a moving picture that pans smoothly. In addition, even when panning the camera fixed to a tripod or by using a motor-driven pan head or the like, the frictional resistance at the tripod or the pan head makes it difficult to achieve the optimal speed and acceleration required for smooth panning. This means that the user needs to have a great deal of experience and skill. If the panning operation is not executed smoothly, the resulting image is bound to be erratic.

Japanese Laid Open Patent Publication No. 2000-261657 discloses a technology whereby the trimming range is automatically adjusted for each frame by tracing a specific photographic subject that is on the move so as to contain it within a central area of the image plane.

SUMMARY OF THE INVENTION

However, the technology disclosed in Japanese Laid Open Patent Publication No. 2000-261657 does not assure optimal speed and acceleration in the movement of the image-capturing range during a panning operation performed to sequentially photograph a wide range of landscape or the like.

The present invention provides a camera with which a smoothly panned moving picture can be obtained by causing the image-capturing range to move with optimal speed and acceleration during a panning operation. The present invention also provides a moving picture editing program used to edit a taken moving picture so as to display the moving picture with smooth panning speed characteristics.

According to the 1st aspect of the invention, a camera with which a moving picture can be taken by panning the camera, comprises: a detection unit that detects actual camera panning speed characteristics; a calculation unit that calculates a speed characteristics difference between the actual panning speed characteristics and reference panning speed characteristics set in advance; and a correction unit that executes correction so as to adjust panning speed characteristics of a moving picture to be obtained closer to the reference panning speed characteristics based upon the speed characteristics difference having been calculated.

According to the 2nd aspect of the invention, in the camera according to the 1st aspect, it is preferred that there is further provided a determining unit that determines the reference panning speed characteristics.

According to the 3rd aspect of the invention, in the camera according to the 1st aspect, it is preferred that the detection unit includes an extraction unit that extracts a target point within the moving picture and detects the actual panning speed characteristics based upon an extent of displacement occurring within the moving picture with regard to the target point extracted by the extraction unit.

According to the 4th aspect of the invention, in the camera according to the 3rd aspect, it is preferred that a position of the target point is calculated based upon a distance from an end of an image-capturing plane.

According to the 5th aspect of the invention, in the camera according to the 1st aspect, it is preferred that the correction unit includes a cropping unit that crops part of the moving picture, and is capable of altering a position at which the picture is to be cropped by the cropping unit.

According to the 6th aspect of the invention, in the camera according to the 5th aspect, it is preferred that the cropping position is adjusted by altering a read-out position from which a picture is read out from an image-capturing element.

According to the 7th aspect of the invention, in the camera according to the 1st aspect, it is preferred that the reference panning speed characteristics are set as characteristics that demonstrate a specific change over time.

According to the 8th aspect of the invention, in the camera according to the 1st aspect, it is preferred that: the detection unit further detects an actual panning direction along which the camera is actually moved; the calculation unit further calculates a direction difference between a reference panning direction and the actual panning direction detected by the detection unit; and the correction unit executes the correction based upon the direction difference and the speed characteristics difference so as to adjust panning speed characteristics of a moving picture to be obtained along the panning direction closer to the reference panning speed characteristics along the reference panning direction.

According to the 9th aspect of the invention, in the camera according to the 8th aspect, it is preferred that there is further provided a direction determining unit that determines the reference panning direction.

According to the 10th aspect of the invention, in the camera according to the 1st aspect, it is preferred that: there is further provided an image-capturing unit that captures the moving picture; the correction unit includes a cropping unit that crops part of the moving picture; and the image-capturing unit captures a wider range of picture than a range of the picture having been cropped by the cropping unit.

According to the 11th aspect of the invention, in the camera according to the 1st aspect, it is preferred that: the calculation unit calculates an offset extent to which the moving picture becomes offset along a direction perpendicular to the panning direction; and the correction unit corrects the offset of the moving picture manifesting along the direction perpendicular to the panning direction based upon the offset extent having been calculated.

According to the 12th aspect of the invention, the computer-readable computer program product contains a program used to edit a moving picture taken by panning a camera. The program comprises: detection processing for obtaining the moving picture and detecting actual camera panning speed characteristics based upon the moving picture; calculation processing for calculating a speed characteristics difference between the actual panning speed characteristics and reference panning speed characteristics set in advance; and correction processing for executing correction based upon the speed characteristics difference having been calculated so as to adjust panning speed characteristics of the obtained moving picture closer to the reference panning speed characteristics.

According to the 13th aspect of the invention, a picture editing method through which a moving picture taken by panning a camera is edited, comprises: obtaining the moving picture taken by panning the camera; calculating a speed characteristics difference between actual camera panning speed characteristics and reference panning speed characteristics set in advance based upon the moving picture having been obtained; and correcting panning speed characteristics of the obtained moving picture based upon the speed characteristics difference having been calculated so as to adjust the panning speed characteristics of the moving picture closer to the reference panning speed characteristics.

DESCRIPTION OF PREFERRED EMBODIMENTS

The embodiments of the present invention are now explained in reference to the drawings.

First Embodiment

Figure 1:
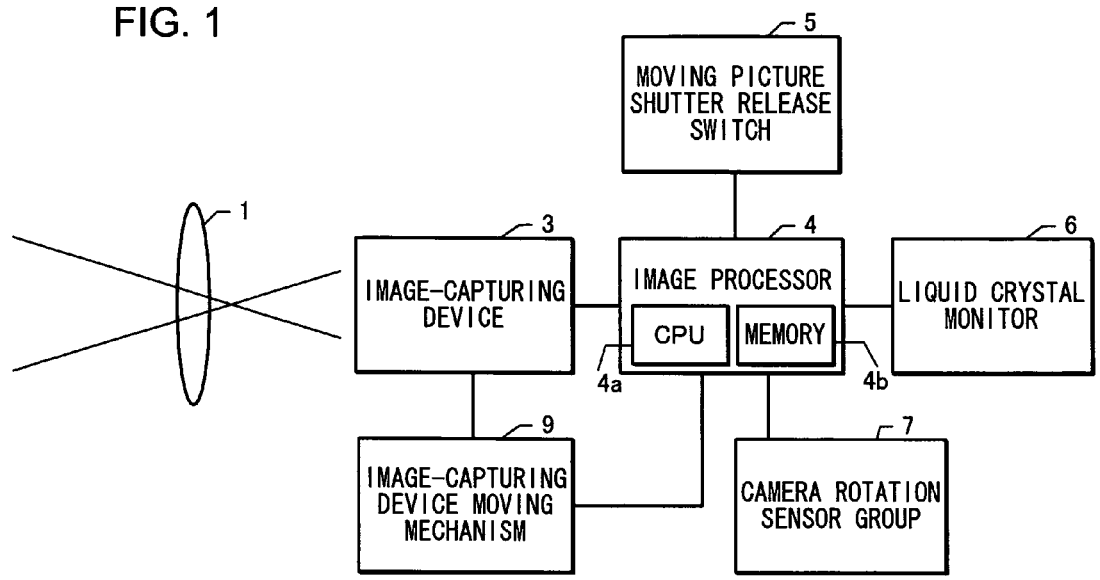
FIG. 1 is a block diagram schematically illustrating the electronic camera achieved in a first embodiment of the present invention with which moving pictures can be taken.

FIG. 1 is a block diagram schematically illustrating the electronic camera with which dynamic images or moving pictures can be taken, achieved in the first embodiment of the present invention. The electronic camera in FIG. 1 includes a photographic lens 1, an image-capturing device 3 constituted with a CCD image sensor, a CMOS image sensor or the like, an image processor 4 constituted with a CPU 4a, a memory 4b and the like, a moving picture shutter release switch 5, a liquid crystal monitor 6 used as a display device, a camera rotation sensor group 7 that detects the movement of the electronic camera and an image-capturing device moving mechanism 9. On the image-capturing surface of the image-capturing device 3, a subject image is formed with subject light having passed through the photographic lens 1.

The electronic camera achieved in the embodiment may be a video camera exclusively used to take moving pictures or a digital still camera with which moving pictures can be taken.

While the power to the electronic camera is in an ON state, the image-capturing device 3 repeatedly and continually captures a subject image. The image-capturing device 3 stores a signal charge at each pixel in correspondence to the brightness level of the subject image during the image-capturing operation. The stored charges are sequentially discharged from the image-capturing device 3 in response to a drive signal provided to the image-capturing device 3 from a drive circuit (not shown). The signal charges first undergo a specific type of analog processing at an analog signal processing circuit (not shown), and then they are converted to digital image-capturing signals at an A/D conversion circuit (not shown) before they are guided to the image processor 4.

The image processor 4 provides the image-capturing device 3 with instructions indicating the length of image-capturing period (the length of charge storage period) and the like. In addition, the image processor 4 executes image processing on a digital image-capturing signals, including correction processing executed based upon a reference panning direction to be detailed later as well as white balance adjustment processing and edge compensation processing. Image data resulting from the image processing are recorded into the memory 4b and are also output to the liquid crystal monitor 6. As a shutter release operation signal is input thereto from the moving picture shutter release switch 5, the image processor 4 starts a moving picture photographing sequence and issues an instruction for starting a stored charge discharge at the image-capturing device 3.

The camera rotation sensor group 7, which may be constituted with angular speed sensors or acceleration sensors, detects changes θx and θy occurring with regard to the photographing direction along the horizontal direction (x direction) and along the direction of gravity (y direction) as the camera rotates. Information indicating the changes in the photographing direction having been detected is provided to the image processor 4. Based upon signals indicating the changes manifesting along the photographing direction, which have been received from the camera rotation sensor group 7, the image processor 4 transmits a move signal instructing a move for the image-capturing device 3 to the image-capturing device moving mechanism 9.

More specifically, the camera rotation sensor group 7 may include, for instance, two angular speed sensors to individually detect the angular speed of the camera around the y axis (along the horizontal direction) and the angular speed of the camera around the x axis (along the direction of gravity) relative to the subject. By individually integrating these angular speeds once over each time period t, the rotational angle θx along the horizontal direction and the rotational angle θy along the direction of gravity can be calculated.

Alternatively, the camera rotation sensor group 7 may include three acceleration sensors. In this case, the angular acceleration in the horizontal direction can be detected based upon the difference between the outputs from the two acceleration sensors disposed side-by-side along the horizontal direction and the angular acceleration in the direction of gravity can be detected based upon the difference between the outputs from two acceleration sensors disposed side-by-side along the direction of gravity in a sensor combination different from the former combination of the acceleration sensors. By individually integrating these angular accelerations twice over every time period t, the rotational angle θx in the horizontal direction and the rotational angle θy in the direction of gravity can be calculated.

The image-capturing device moving mechanism 9 includes a drive element such as a piezoelectric element, and is capable of moving the image-capturing device 3 by a very small extent within a plane perpendicular to the optical axis based upon a signal provided by the image processor 4. With the camera rotation sensor group 7 and the image-capturing device moving mechanism 9 adopting the structures described above, unsteady hand movement correction can be executed.

With this camera, images or pictures can be obtained successively over short cycles, e.g., 1/15 sec or 1/30 sec, by adjusting the method with which signals are read out at the image-capturing device 3. Then, the series of images thus obtained over these short cycles can be saved as a moving picture. An explanation is given here on an example in which images are taken in at the rate of a single frame each 1/30 sec.

Figure 2:
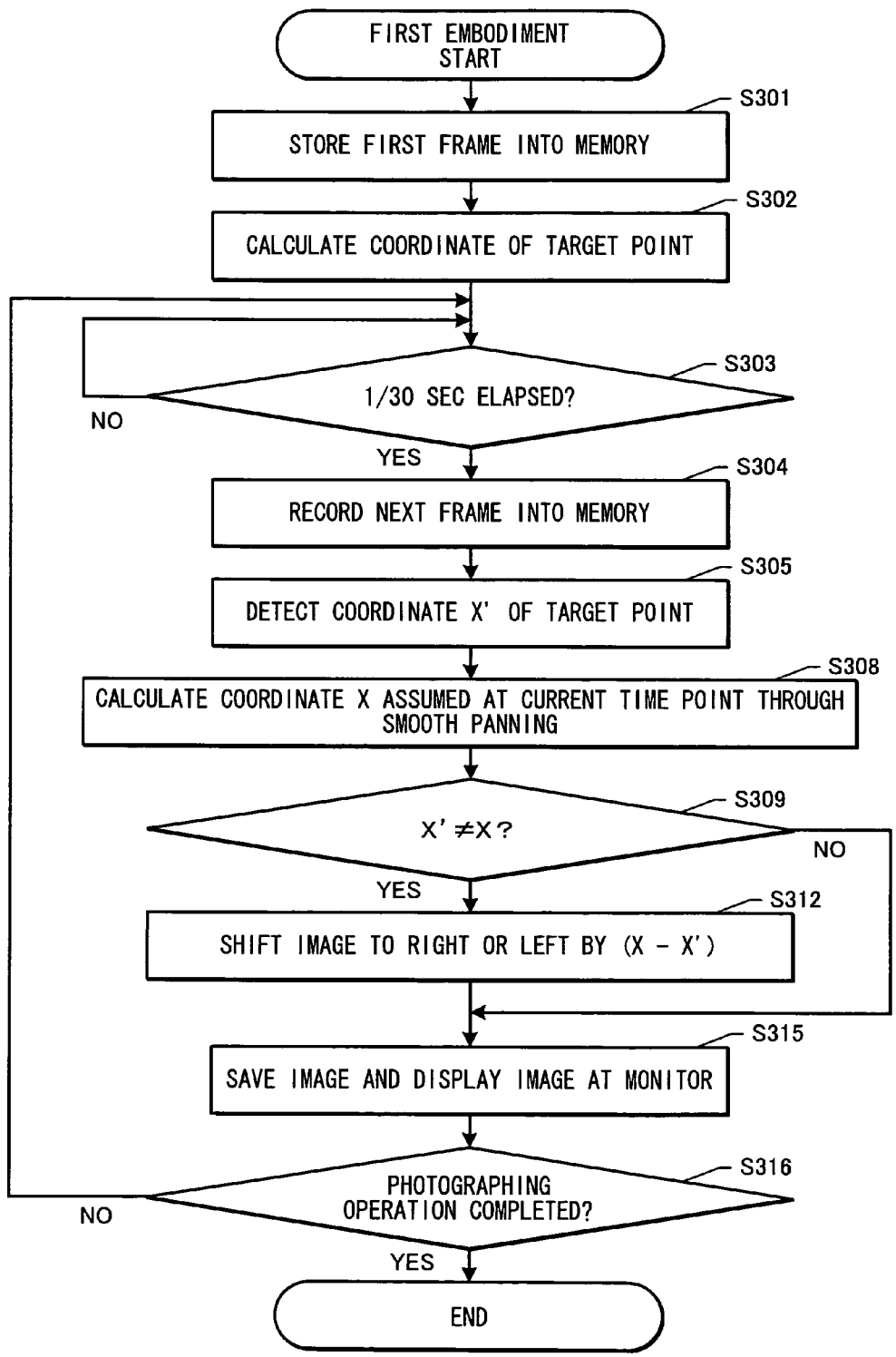
FIG. 2 presents a flowchart of the panning processing and the correction processing executed in the first embodiment.

FIG. 2 presents a flowchart of the panning processing and the correction processing executed in the first embodiment. FIGS. 3 through 7B illustrate the procedure of the correction processing. It is assumed that the user is manually panning the camera fixed to a tripod along the horizontal direction perpendicular to the direction of gravity, to the right in FIGS. 3 through 7B. Since the camera is being panned to the right, the user first sets an image composition at the furthest left end of the range to be photographed. Then, the user starts to pan the camera at a desired speed (desired speed characteristics).

Figure 3:
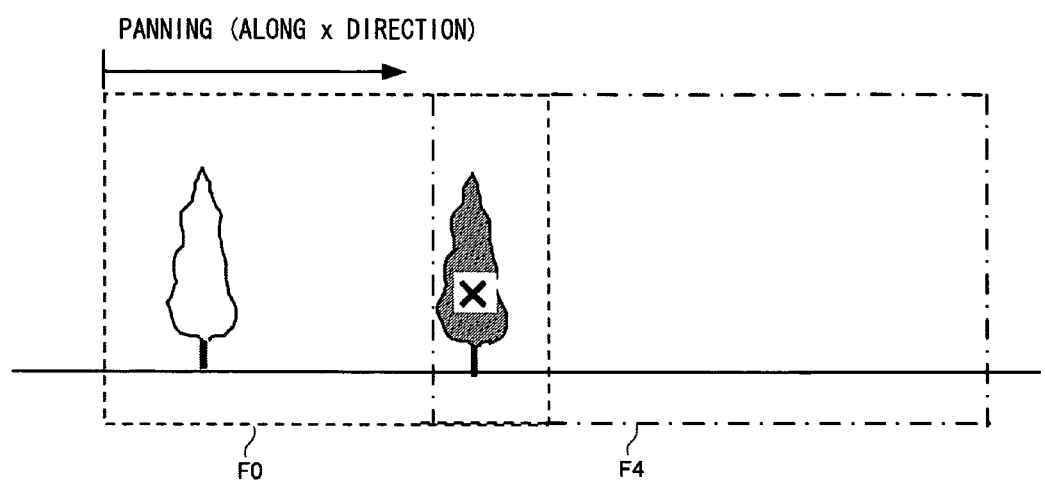
FIG. 3 shows how the image plane moves during a panning operation.

FIG. 3 shows how the photographic image plane may move relative to a stationary photographic subject during a panning operation. A frame F0 defined by the dotted line on the left side indicates the panning start position, whereas the frame F4 defined by the one-point chain line on the right side indicates the panning end position. FIG. 3 shows that two trees are photographed as the subject at the panning start position. In the embodiment, a target point (marked by "X" in FIG. 3) is set on a photographic subject within the image plane and any movement of the image plane is detected by detecting the position of the target point within the image plane. In order to facilitate the explanation, it is assumed that the camera is panned along the horizontal direction and the coordinate value of the target point taken along the panning direction (x direction) alone is examined.

Figure 4A:
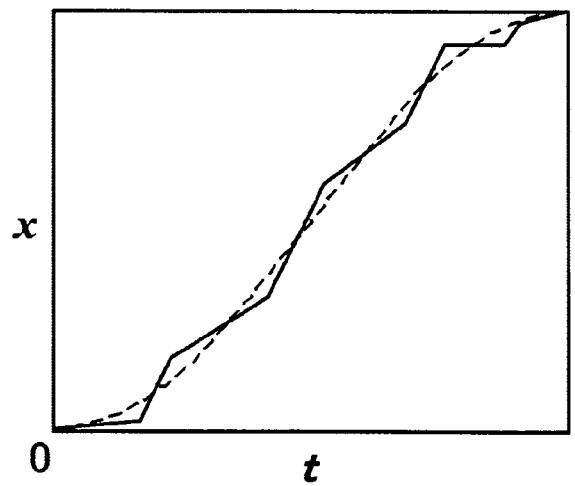
FIGS. 4A and 4B show how a coordinate of a target point changes over time.
Figure 4B:
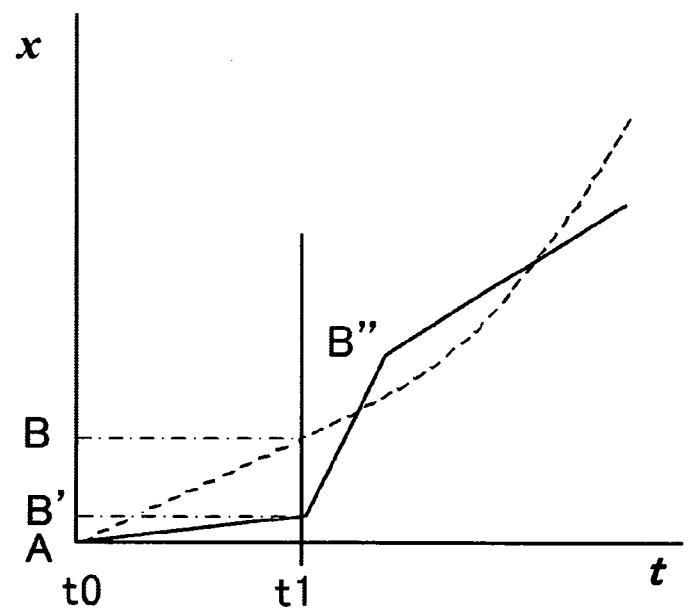

FIGS. 4A and 4B show how the coordinate of the target point changes over time. The horizontal axis represents the length of time t and the vertical axis represents the coordinate value of the target point taken along the x direction. FIG. 4A shows the overall speed characteristics starting at the panning start position and going over to the panning end position. FIG. 4B shows in an enlargement part of the speed characteristics achieved over a range near the panning start position.

When the camera is panned in an ideal (smooth) manner, the coordinate changes as indicated by the dotted line in FIG. 4A. The dotted line in FIG. 4A initially starts to move little by little, accelerates, then achieves a constant speed and gradually decelerates until it stops.

The solid line in FIG. 4A represents an actual panning operation that may be performed in an unstable condition. While a force is applied to pan the camera up to the time point t1, the target point only moves by a very small extent to B' due to the sliding resistance attributable to the static friction at the pan head. However, once past the time point t1, the static friction changes to kinetic friction, thereby lessening the resistance and inducing acceleration. Since an excessive level of force is being applied at this time, the acceleration is also excessive, which displaces the target point all the way to B". At this time, the operator reduces the force being applied and attempts to adjust it so as to achieve a constant speed while continuing with the panning operation. However, since the panning operation is performed manually, a certain degree of inconsistency in the speed is inevitable.

During deceleration, the panning speed is reduced with the force applied gradually reduced. During this process, the level of force may become insufficient at the point where static friction takes effect, which will result in the speed becoming lower more rapidly than expected by the user. In this situation, the movement may even stop and start. The user pans the camera to the panning end point while readjusting the level of force applied.

The actual panning characteristics that manifest when a panning operation is performed manually with a camera placed on a pan head are usually unstable, as indicated by the solid line, for the reasons detailed above. In addition, the panning characteristics resulting from a manual panning operation performed without fixing the camera onto the pan head of a tripod are also unstable, as indicated by the solid line in FIG. 4A, and thus, a smoothly panned moving picture cannot be obtained with ease.

FIGS. 5A to 5E and FIGS. 6A to 6E indicate the image-obtaining positions assumed at the time points t0, t1, t2, t3 and t4. FIGS. 5A to 5E show the image-obtaining positions assumed in an ideal condition (when the speed characteristics indicated by the dotted line in FIG. 4A are achieved), whereas FIGS. 6A to 6E show the image-obtaining positions assumed in an unstable condition (when the speed characteristics are as indicated by the solid line in FIG. 4A). It is to be noted that the image-obtaining positions in FIGS. 5A and 6A correspond to the panning start position F0 in FIG. 3, whereas the image-obtaining positions in FIGS. 5E and 6E correspond to the end position F4 in FIG. 3.

The outer frame defined by the fine dotted line in each figure indicates the range of the image initially obtained by the image-capturing device 3, whereas the inner frame indicated by the bold dotted line indicates the range of the image in each of the frames F0 to F4 ultimately obtained by the image processor 4. If no correction is executed, the central area of the range of the image initially obtained with the image-capturing device 3 is ultimately obtained by the image processor 4.

In order to facilitate the explanation, the coordinate values A to E and A' to E' of the target point are each indicated by the distance to the target point from the right end of the range (the range indicated by the bold dotted lines in FIGS. 5A and 5E) of the image ultimately obtained at the image processor 4 through an ideal panning operation. However, it is more desirable to determine the distance from the end edge of the range of the image initially obtained by the image-capturing device 3 and calculate the coordinate value based upon this distance in the actual measurement.

Figure 5A:
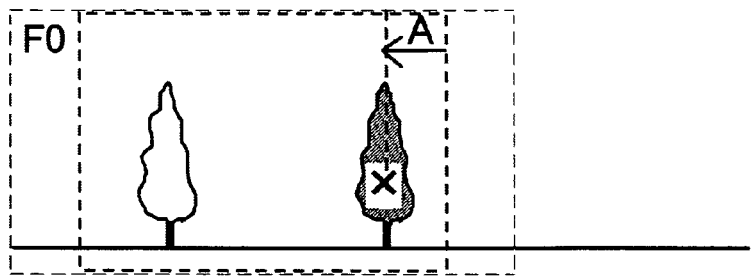
FIGS. 5A to 5E show the image-obtaining positions at time points t0 t1, t2, t3 and t4 in an ideal condition.
Figure 5B:
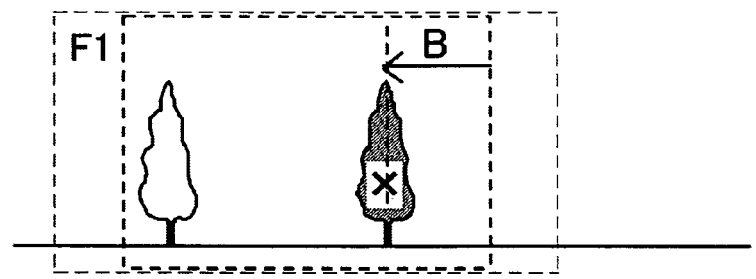
Figure 5C:
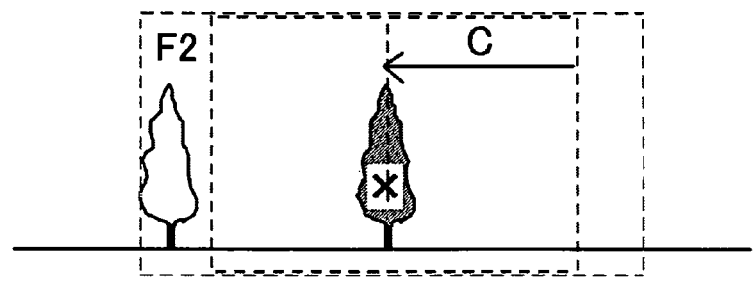
Figure 5D:
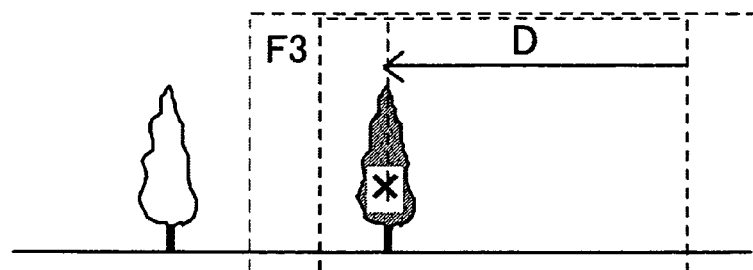
Figure 5E:
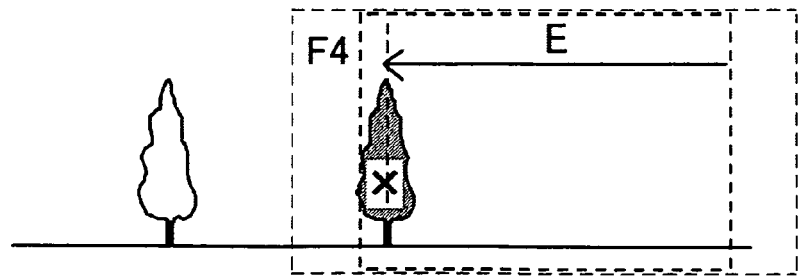
Figure 6A:
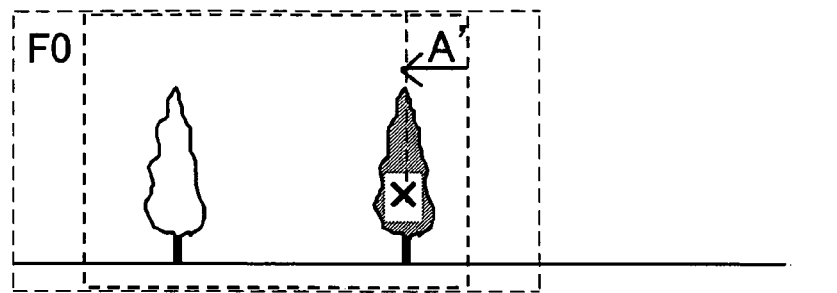
FIGS. 6A to 6E show the image-obtaining positions at the time points t0 t1, t2, t3 and t4 in an unstable condition.
Figure 6B:
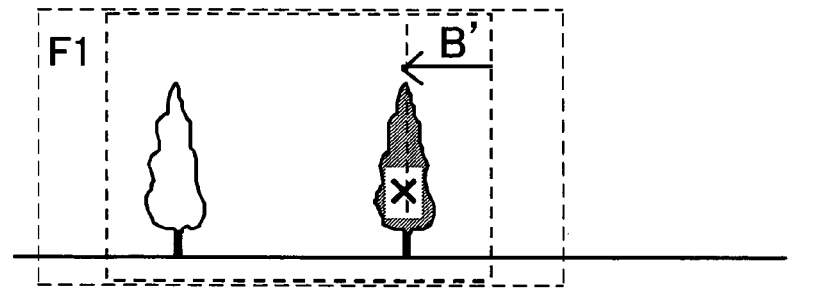
Figure 6C:
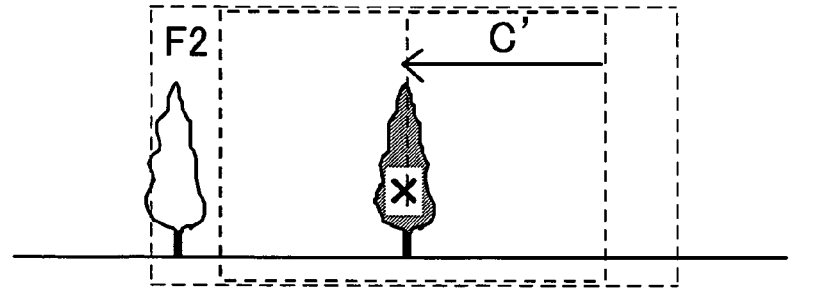
Figure 6D:
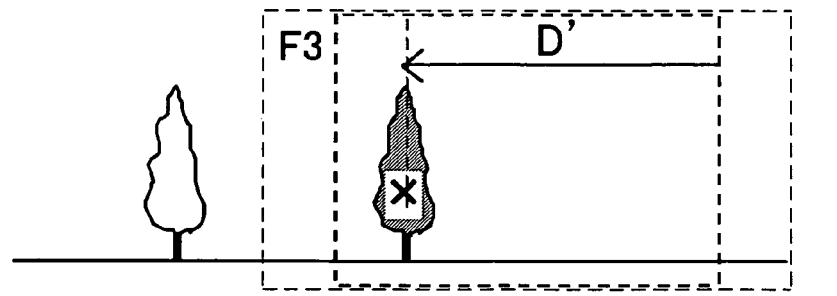
Figure 6E:
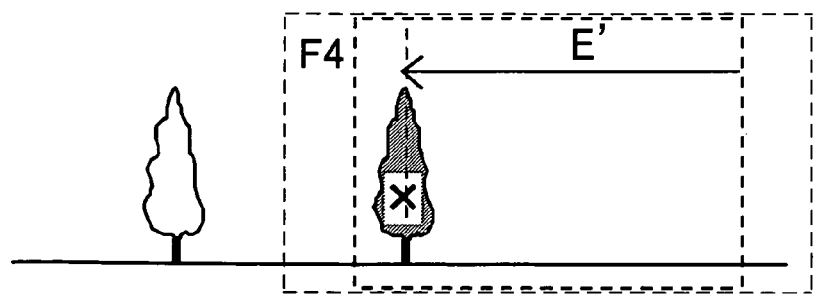

FIGS. 5A to 5E and FIGS. 6A to 6E indicate that while the coordinate of the target point has moved to the position B by the time point t1 in the ideal condition, as shown in FIG. 5B, the coordinate has only moved to a smaller extent to the coordinate B', as shown in FIG. 6B in the unstable condition.

Accordingly, the following processing is executed to adjust the coordinate of the target point in FIG. 6B closer to the ideal value B.

The image processor 4 first obtains the image data for the first frame F0 from the image-capturing device 3 and temporarily saves them into the memory 4b (step S301). Then, it extracts the coordinate A' assumed along the x direction by the target point indicated by the "X" mark (positional information indicating the position of the target point within the photographic image plane) from the image data for the first frame F0 and temporarily saves the coordinate data into the memory 4b (step S302). The target point can be extracted by adopting a face-position decision-making technology or another characteristics extraction technology in the known art. For instance, the target point can be extracted by extracting an area where the brightness greatly differs from that at nearby pixels or an area where the hue is different from that of nearby pixels within the image and calculating the position of the gravitational center in the area. Alternatively, the user may select a target point in an image taken in before taking the moving picture. It is to be noted that the photographic subject containing the target point should be stationary.

When 1/30 sec elapses after photographing the image in the first frame F0 (step S303: YES) the image data for the second frame F1 are obtained from the image-capturing device 3 and are temporarily saved into the memory 4b (step S304). Then, with regard to the target point having been extracted in the first frame F0 its coordinate position in the second frame F1 is detected (step S305). It is to be noted that if the target point in the preceding frame has moved out of the image-capturing range of the current frame, the coordinate of the target point cannot be detected. In such a case, a new target point contained in both the preceding frame and the current frame is extracted.

Figure 7A:
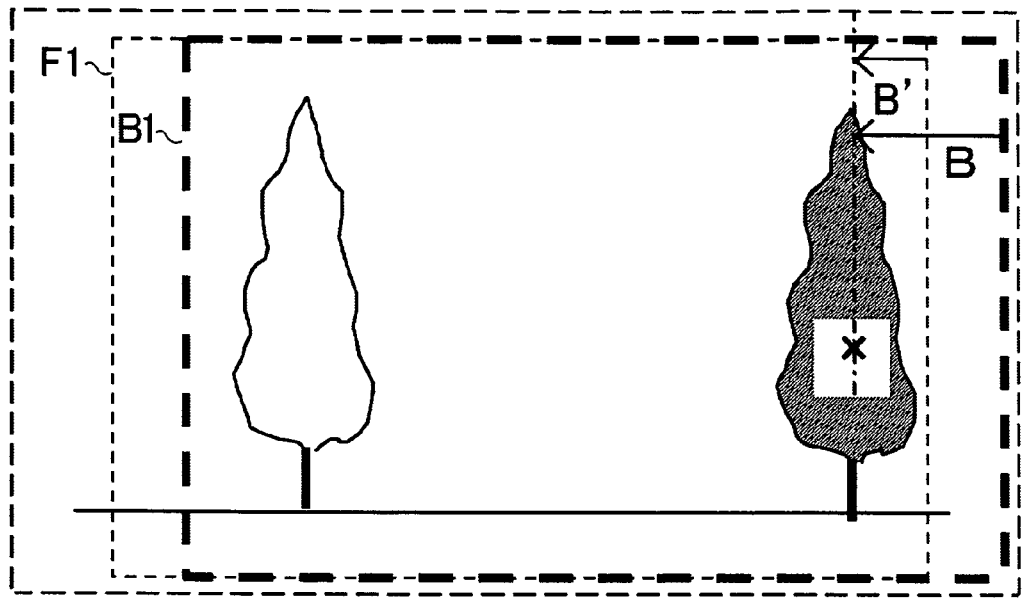
FIGS. 7A and 7B illustrate the correction of the image cropping position for the image in the frame F1 at the time point t1.
Figure 7B:
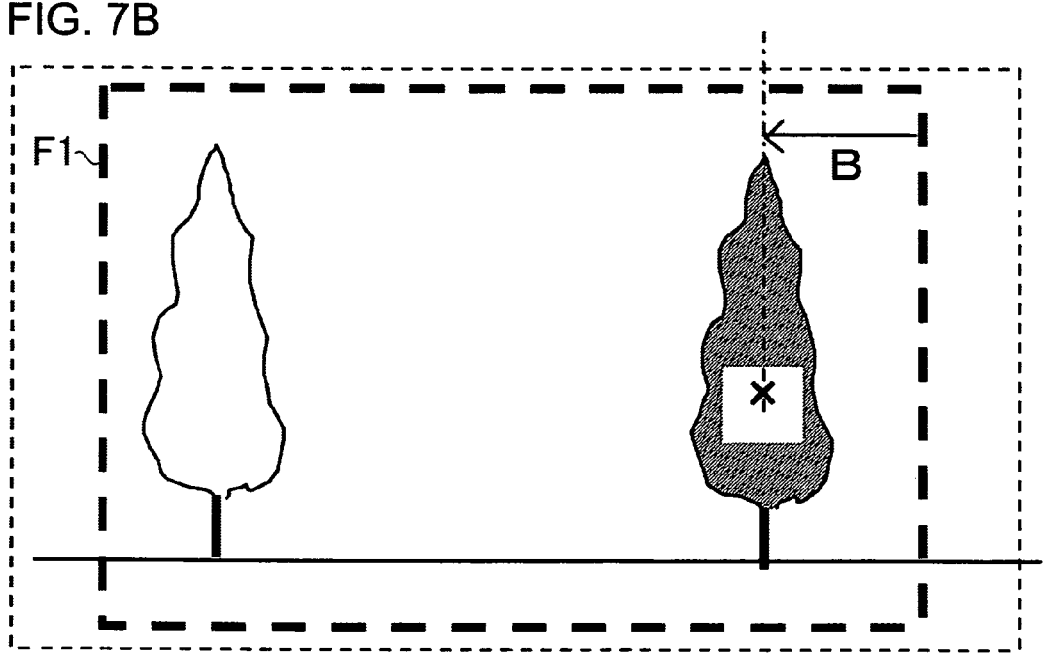

FIGS. 7A and 7B illustrate the correction of the image cropping position for the image in the frame F1 obtained at the time point t1. In both FIGS. 7A and 7B, the outermost dotted line indicates the range of the image initially taken in at the image-capturing device 3. The desirable range of the image to be ultimately obtained is indicated by the inner bold dotted line. The range over which the image is initially taken in at the image-capturing device 3 is set greater than the ultimate image range since the image plane is bound to be clipped through the cropping. The image may be taken in initially over a greater range by, for instance, setting the lens to a slightly wider angle setting.

If the image cropping position is not corrected, the image in the central area of the image range in FIGS. 7A and 7B is ultimately obtained. Accordingly, if the image is obtained at the time point t1 with the ideal panning speed characteristics determined by the image processor 4, as shown in FIG. 7B, the target point X is present at the position distanced by B from the right end and, in this case, no correction is required. However, if the image photographed with speed characteristics other than the ideal panning speed characteristics is obtained at the time point t1 and the central image area indicated by the fine dotted line frame F1 is cropped, as shown in FIG. 7A, the target point X moves to the position distanced by B' from the right end. For this reason, the cropping range is moved to the right in the image plane for the image obtained at the time point t1 in FIG. 7A so as to crop the image over the image range B1 indicated by the bold dotted line. This adjusts the position of the target point X to the position distanced by B from the right end of the image plane, which is the position achieved with the ideal panning speed characteristics.

Within the memory 4b built into the camera, the ideal speed characteristics achieved through smooth panning, such as those indicated by the dotted line in the graph in FIG. 4A, for instance, are stored. Such speed characteristics may be determined in advance or may be input through a user operation. Based upon the ideal speed characteristics, an ideal displacement B-A to occur during the period elapsing between the time points t0 and t1 (see FIGS. 5A and 5B) is determined, and based upon the ideal displacement, the ideal coordinate value B to be achieved for the target point at the time point t1 is calculated (step S308).

It is to be noted that the ideal displacement may be estimated based upon the manner with which a plurality of frames of photographed images, including preceding and subsequent frames, move without using a curve obtained in advance, such as that indicated by the dotted line in FIG. 4A. However, when the image position is to be corrected in real-time during a photographing operation, the ideal displacement should be estimated based upon the movement in the frames of image shaving been photographed before the image in the correction target frame. If, on the other hand, the image position is to be corrected while editing the image after the photographing operation, the ideal displacement should be estimated based upon the frames of images photographed before and after the image in the correction target frame was photographed. If the image position correction is executed after the photographing operation, the ideal displacement for each frame may be calculated based upon the images in two frames obtained during the panning operation and the number of frames of images photographed in between the two image frames. Such ideal speed characteristics (reference panning speed characteristics) are determined by the image processor 4.

Then, the ideal coordinate B for the target point shown in FIG. 5B is compared with the actual coordinate B' in FIG. 6B, and if they are different (step S309: YES), the image is corrected so as to match the coordinate value of the target point with the ideal coordinate value B. More specifically, by shifting the image cropping position to the right by B-B', the image is set within the range indicated by the bold dotted line B1 in FIG. 7A (step S312). This operation is equivalent to displacing the target point to the coordinate position B at an optimal distance from the right end. It is to be noted that if the value of B-B' is negative, the image cropping position is shifted to the left. The cropping position can be adjusted by, for instance, altering the read start position at which the read of the captured image stored in the memory starts.

Alternatively, the cropping position may be adjusted by altering the read start position set for the read from the image-capturing element. In this case, after the difference between the ideal speed characteristics and the actual speed characteristics is detected, the correction for the detected difference is achieved for the image in the frame obtained directly after the detection. This type of correction with a time lag is particularly effective when the camera is panned slowly.

It is to be noted that if it is possible to temporarily save a plurality of frames of image, an image corrected at a given time point does not need to be cropped from the frame corresponding to the matching time point and may instead be cropped from a frame corresponding to another time point that manifests the closest displacement. For instance, if an image with the ideal displacement B, as in FIG. 5B, needs to be obtained for the second frame F1, the displacement C' in the image photographed for the third frame F2 in FIG. 6C may be closer to the ideal displacement B than the displacement B' of the image photographed for the second frame F1 in FIG. 6B. In such a case, the image shown in FIG. 6C should be used to minimize the extent to which the image is clipped.

When the displacement of the image is completed or if it is not necessary to displace the image at all with the coordinate value B' of the target point matching the ideal value B (step S309: NO), the corrected image in the frame is saved into the memory 4b and is displayed at the liquid crystal monitor 6 (step S315). Through this process, the moving picture with its panning speed stabilized through the correction processing can be displayed at the liquid crystal monitor 6 in real-time.

Next, a decision is made as to whether or not the moving picture photographing operation has been completed, and if it is decided that the photographing operation has not ended (step S316: NO), the operation returns to step S303 to wait for ⅓₀ sec to elapse. Subsequently, the frame cropping position is adjusted at each time point so as to ensure that the coordinate position of the target point indicates a change that would occur if the camera were panned smoothly.

Finally, a moving picture is formed by using the series of cropped images. The resulting moving picture is substantially identical to an image constituted with the images shown in FIGS. 5A through 5E that are obtained through smooth panning. Once the moving picture photographing operation ends (step S316: YES), the processing sequence ends.

In the first embodiment, the position of the target point in each of the frames constituting a moving picture is calculated and the characteristics with which the actual position of the target point moves are used as the actual panning speed characteristics. In addition, the positions assumed by the target point in the individual frames when the camera is panned with the reference panning speed characteristics are calculated as reference positions. Then, the difference between an actual position of the target point and the corresponding reference position of the target point along the horizontal direction (the offset quantity) is used to represent the difference between the actual panning speed characteristics and the reference panning speed characteristics during the image processing. As a result, the following advantages are achieved in the embodiment.

(1) The image-capturing range is made to move with the ideal speed and acceleration during a panning operation to achieve a smoothly panned moving picture.
(2) The correction processing can be executed strictly as software processing by cropping a moving picture.
(3) Since the positions of the target point in the individual frames constituting the moving picture are calculated and the characteristics with which the target point position moves are used as the actual panning speed characteristics, only the moving picture data are needed to detect the actual panning speed characteristics.

It is to be noted that while the image is clipped on the two ends by a greater extent when the panning speed is more unstable, the resulting smoothly panned image more than makes up for this disadvantage, and it never becomes a major problem as long as the camera is used in conjunction with a zoom lens set slightly toward the wide-angle side.

A plurality of sets of ideal speed characteristics may be stored in the memory 4a, the ideal speed characteristics closest to the actual movement characteristics may be extracted (selected) by the image processor 4 and the image-capturing digital signals may then be corrected so as to approximate the extracted ideal speed characteristics. For instance, the ideal speed characteristics closest to the speed calculated in correspondence to B'-A' in FIGS. 6A and 6B may be extracted from a plurality of sets of ideal speed characteristics and correction processing may be executed based upon these ideal speed characteristics.

Alternatively, the user may set the ideal speed characteristics to be used for reference through a user operation from a plurality of sets of ideal speed characteristics stored in the memory 4a. This setting selected by the user is then read and confirmed by the image processor 4.

Second Embodiment

Next, in reference to the second embodiment, an application in which correction of the panning direction is executed by detecting the panning direction, in addition to the correction of the panning speed characteristics. Since the second embodiment is achieved by adopting the hardware configuration similar to that of the first embodiment shown in FIG. 1, an explanation of the structural features is omitted and the following explanation focuses on the functions achieved in the embodiment. The following explanation is given by assuming that the user pans a hand-held camera to the right along the horizontal direction perpendicular to the direction of gravity. The explanation is given by assuming that horizontal panning has been set in a camera panning direction setting mode and reference panning speed characteristics (e.g., the characteristics indicated by the dotted line in FIG. 4A) matching the horizontal direction has been set in a camera panning speed characteristics setting mode. These settings are read and confirmed by the image processor 4.

Figure 8:
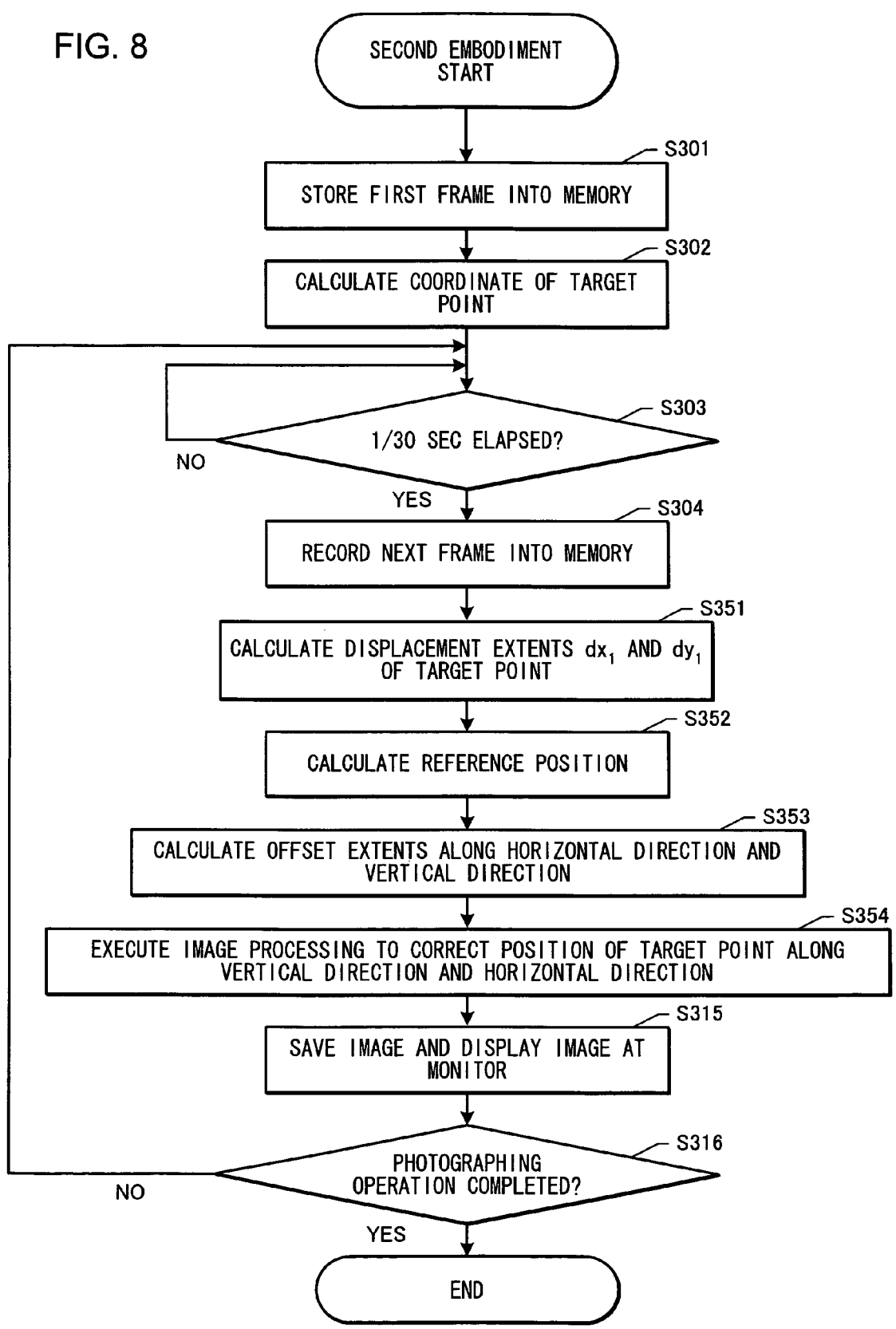
FIG. 8 presents a flowchart of the panning processing and the correction processing executed in a second embodiment.

FIG. 8 presents a flowchart of the panning processing and the correction processing executed in the second embodiment. FIGS. 9 through 12 illustrate the procedure of the panning direction correction processing, which is part of the correction processing. It is assumed that the user is panning a hand-held camera to the right along the horizontal direction perpendicular to the direction of gravity in FIGS. 9 through 12. Since the camera is being panned to the right, the user first sets an image composition at the furthest left end of the range to be photographed. Then, the user starts to pan the camera at a desired speed, e.g., at the speed with which the frame moves by an extent equivalent to a single image plane over a four-second period.

Figure 9:
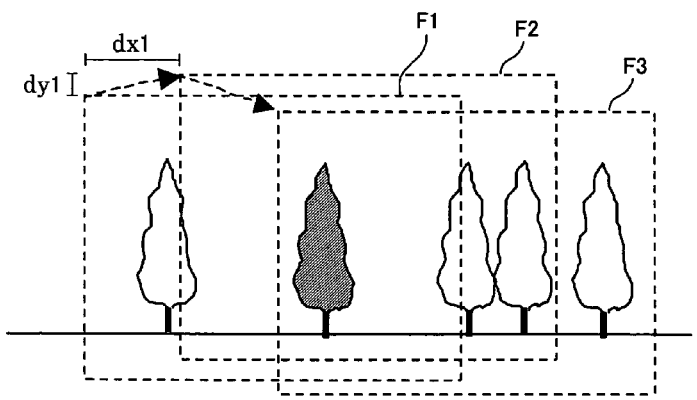
FIG. 9 shows how the image plane moves during a panning operation relative to a stationary photographic subject.

FIG. 9 shows how the captured image plane moves relative to a stationary subject during a panning operation. Rectangles F1, F2 and F3 defined by dotted lines each indicate the range of the image in a frame captured by the image-capturing device 3.

Figure 10:
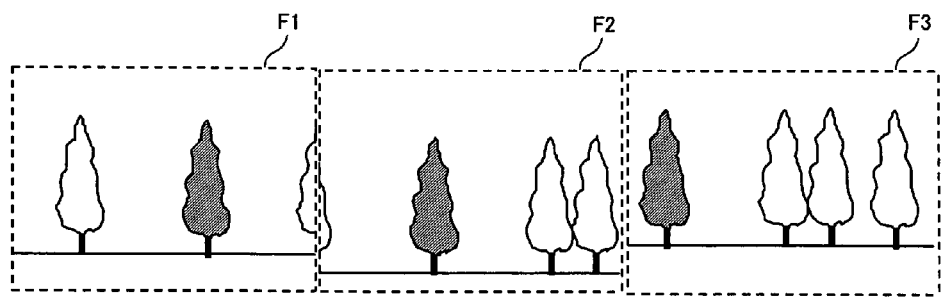
FIG. 10 shows the images in the individual frames F1, F2 and F3 captured with the composition shown in FIG. 9.

FIG. 10 shows the images in the individual frames F1, F2 and F3 captured with the compositions shown in FIG. 9. As the captured image plane moves relative to the subject, as shown in FIG. 9, three images are captured by the image-capturing device 3, as shown in FIG. 10. Let us assume that during the period of time elapsing between the time point at which the first frame F1 is photographed and the time point at which the second frame F2 is photographed, the image-capturing range shifted diagonally relative to the stationary subject on the image-capturing plane by dx1 to the right and dy1 upward. In the embodiment, the values dx1 and dy1 are detected based upon the extent of displacement of the target point on the image data.

Figure 11:
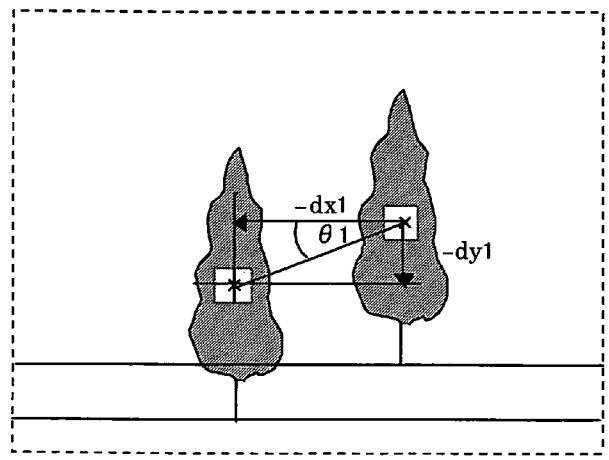
FIG. 11 illustrates the positional shift of the target point occurring during a panning operation.

FIG. 11 illustrates the displacement along the vertical direction and the horizontal direction during the panning operation, with the image in the first frame F1 and the image and the second frame F2 shown in FIGS. 9 and 10 superimposed so as to align the edges of the individual images. The image processor 4 extracts a target point in the first frame F1. The target point can be extracted by adopting a face-position decision-making technology or another characteristics extraction technology in the known art. For instance, the target point can be extracted by extracting an area where the brightness greatly differs from that at nearby pixels or an area where the hue is different from that of nearby pixels within the image and calculating the position of the gravitational center in the area. Alternatively, the user may select an arbitrary target point in an image taken in before photographing the moving picture. It is to be noted that the photographic subject containing the target point should be stationary.

The processing executed in steps S301 to S304 in the flowchart presented in FIG. 8 is similar to that in the flowchart in FIG. 2 in reference to which the first embodiment has been explained. After the image in the next frame is recorded into the memory in step S304, the operation proceeds to step S351. In step S351, dx1 and dy1 representing the extent of displacement of the target points within the image-capturing range, which has occurred between the time point at which the first frame F1 was photographed and the time point at which the second frame F2 was photographed, are a calculated. FIG. 11 indicates that the target point marked with "X" has moved to the left by dx1 and has moved down by dy1. Since the horizontal direction is set (selected) as the reference panning direction, the image processor 4 is able to let dy1 represent the extent to which the image is offset relative to the ideal panning direction, i.e., the horizontal direction, and calculate the speed along the horizontal direction based on dx1.

The horizontal panning speed is now explained. Since a single frame of image is taken in every 1/30 sec, the reference position of the target point within the photographic image plane as the target point moves along the horizontal direction with the reference panning speed characteristics having been set, is calculated every 1/30 sec in step S352 in the embodiment. The reference position along the vertical direction, too, is calculated in this step. Then, the offset extents (differences) to which the actual position of the target point within the photographic image plane detected every 1/30 sec is offset from the reference position of the target point along the horizontal direction and the vertical direction are calculated (step S353). In step S354, image processing is executed on the captured image so that the offset extent dy1 to which the target point is offset along the vertical direction, having been determined in step S351, is reduced to zero and so that the difference between the target point and the reference point manifesting along the horizontal direction, having been calculated in step S353, is reduced to zero.

Once the image processing in step S354 is completed, the image is displayed at the monitor in step S315, and the processing described above is continuously executed until it is decided in step S316 that the photographing operation has ended.

Figure 12:
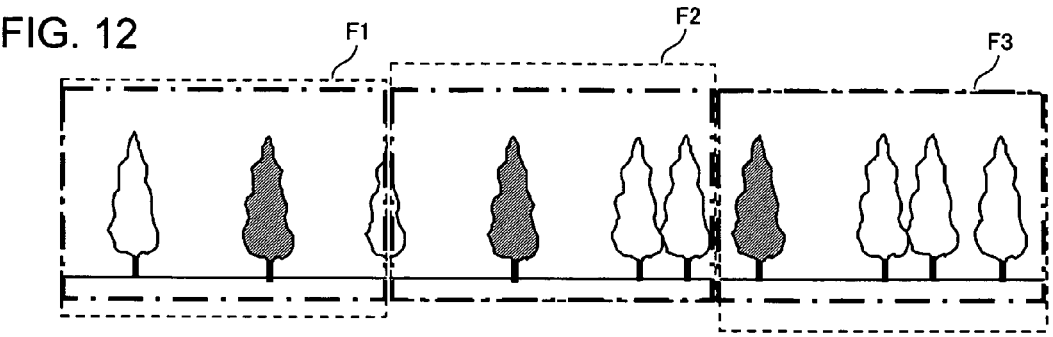
FIG. 12 presents an example of images in the frames F1, F2 and F3 that may be obtained by correcting the images in FIG. 10.

FIG. 12 presents an example of images in the frames F1, F2 and F3 that may be obtained by correcting the panning direction and the panning speed along both the vertical direction and the horizontal direction for the frame images shown in FIG. 10. As indicated by the one-point chain line in FIG. 12, the vertical vibration in the moving picture has been corrected by adjusting the upper edges of the individual frames to match the upper edge of the frame F3 at the lowest position and adjusting the lower edges of the individual frames to match the lower edge of the frame F2 at the highest position. Although not shown, any offset attributable to the speed characteristics along the horizontal direction, too, is corrected.

In the second embodiment, the positions of the target point are calculated in correspondence to the individual frames constituting a moving picture and the characteristics with which the actual position of the target point moves are used as panning speed characteristics along the actual panning direction. In addition, the positions assumed by the target point in the individual frames when the camera is panned with the reference panning speed characteristics along the reference panning direction are calculated as reference positions. Then, the difference between an actual position of the target point and the corresponding reference position of the target point along the horizontal direction (the offset quantity) is used to represent the difference between the actual panning speed characteristics and the reference panning speed characteristics and the difference manifesting along the vertical direction is used to represent the difference between the actual panning direction and the reference panning direction. As a result, the following advantages are achieved in the embodiment, in addition to the advantages of the first embodiment.

(1) A moving picture panned along a stable direction can be obtained by minimizing the extent of instability with regard to the panning direction.

(2) The correction processing can be executed strictly as software processing by partially cropping the moving picture.

(3) Since a moving picture panned along a panning direction stabilized through the correction processing is displayed at the liquid crystal monitor 6 in real-time, the user is able to photograph the moving picture while checking the moving picture in the state in which it will appear after the panning correction.

(4) Since the positions of the target point in the individual frames constituting the moving picture are calculated and the direction along which the target point position moves is regarded as the actual panning direction, only the moving picture data are needed to detect the actual panning direction.

(5) Since any offset manifesting along the vertical direction is also corrected, the image does not blur along the upward/downward direction when the camera is panned along the horizontal direction, which makes it possible to obtain an very smoothly panned moving picture.

It is to be noted that while the image may appear to have its periphery somewhat clipped off when the offset manifesting along the vertical direction is significant or the deviation of the actual horizontal speed relative to the reference speed is significant, the resulting image, which is panned at the accurate angle, more than makes up for this disadvantage, and it should not become a major problem as long as the camera is used in conjunction with a zoom lens set slightly toward the wide-angle side.

While an explanation is given above on an example in which the camera is moved along the horizontal direction with the ideal reference panning speed characteristics (as indicated in FIG. 4A) for purposes of simplification, the entire image should be processed so as to correct the position of the target point in case that the camera is moved along the vertical direction with ideal reference panning speed characteristics based upon the extent to which the target point is offset along the horizontal direction perpendicular to the vertical panning direction and the extent to which the target point is offset from the reference position due to the speed deviation manifesting along the vertical direction. In addition, when the camera is panned along a diagonal direction of 45° with the ideal speed characteristics or when the camera is panned with ideal speed characteristics in any other direction, image processing should be executed so as to shift the position of the target point to the ideal position in a similar manner.

The reference panning direction may be stored in advance in the memory 4a or the reference panning direction setting may be entered by the operator.

EXAMPLES OF VARIATIONS

While an explanation is given above in reference to the first and second embodiments on an example in which the extent to which the image plane moves is calculated based upon the change in the coordinates of the target point, the extent of movement may instead be calculated by adopting another method. For instance, the angular speed or the acceleration with which the camera rotates may be detected based upon the output from the camera rotation sensor group 7 such as that included in the electronic camera in FIG. 1, the direction and extent of movement of the image plane may be calculated based upon the angular speed or the acceleration and image processing may be executed based upon the direction and extent of movement of the image plane determined in correspondence to the ideal reference panning speed characteristics along the ideal panning direction.

While the correction is executed in the first and second embodiments by clipping part of the image and adjusting the clipping position, the correction may be achieved by adopting another method. For instance, a mechanism for unsteady hand movement correction may be engaged in operation for the correction, e.g., by moving the image-capturing device 3 to a very small extent with the image-capturing device moving mechanism 9, by disposing an image blur correction optical system for deflecting the photographing light and minimizing the extent of image blur inside the photographic lens, or by electrically moving the image-capturing range of the image-capturing device so as to adjust the image position on the image-capturing plane. Through such a correction method, which does not require any part of the moving picture data to be cropped, correction can be executed substantially in real-time without lowering the image quality or wasting the image data. In addition, such a mechanism can also be used for unsteady hand movement correction. It is to be noted that the differences mentioned earlier should be calculated by utilizing angular speed sensors or the like when a method that requires the image-capturing device to be moved or requires the use of an image blur correction optical system is adopted.

While an explanation is given above in reference to the first and second embodiments on an example in which the correction is mostly executed concurrently during the photographing operation, the correction may instead be executed after the entire photographing operation ends. For instance, the technology of the present invention can be effective in an application in which photographed image data are read into a personal computer, the panning speed and the panning direction are analyzed by using moving picture editing software or the like, the positions of the individual frames are corrected so as to achieve a panned moving picture with a stable panning speed along a stable panning direction, and the corrected moving pictures are recorded into a recording medium and displayed at a monitor.

Figure 13:
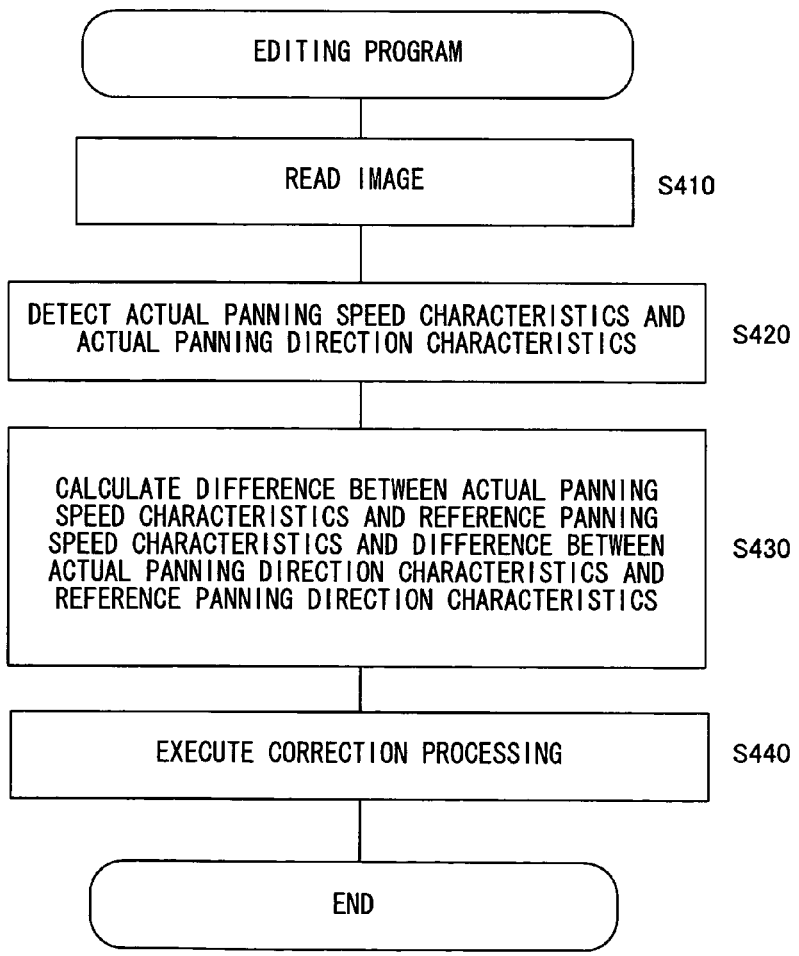
FIG. 13 presents a flowchart of the processing procedure implemented by executing a program for panning speed characteristics and panning direction characteristics correction.

In order to execute processing similar to that in the second embodiment on a personal computer, a program that enables execution of the processing shown in FIG. 13 is installed in the personal computer.

Namely, a program used to edit a moving picture photographed while panning the camera enables a computer to execute processing for reading a moving picture (step S410), detection processing for detecting the actual panning speed characteristics and the actual camera panning direction characteristics based upon the moving picture having been read (step S420), calculation processing for calculating the speed characteristics difference between the actual panning speed characteristics and reference panning speed characteristics set in advance and a direction characteristics difference between the actual panning direction characteristics and reference panning direction characteristics set in advance (step S430), and correction processing for correcting the panning speed characteristics and the panning direction characteristics of a moving picture to be obtained by adjusting the characteristics closer to the reference panning speed characteristics and the reference panning direction characteristics based upon the speed characteristics difference and the direction characteristics difference (step S440).

With regard to the processing executed to correct the panning speed characteristics, the processing in step S420 is equivalent to that executed in steps S302 through S308 in FIG. 2 and the processing in step S430 is equivalent to that executed in step S318 in FIG. 2.

Figure 14:
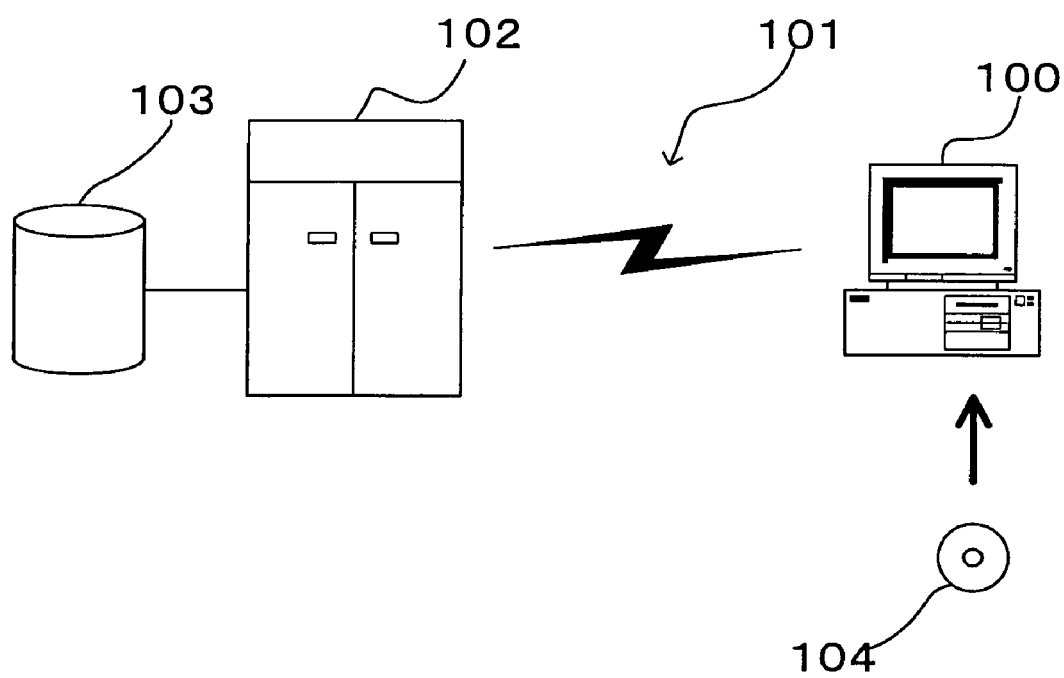
FIG. 14 shows how the moving picture editing program may be provided to a personal computer.

The moving picture editing program executed on a personal computer may be provided in a recording medium such as a CD-ROM or as a data signal on the Internet or the like. FIG. 14 shows how the program may be provided through such media. A personal computer 100 receives the program via a CD-ROM 104.

In addition, the personal computer 100 has a function which enables it to achieve a connection with a communication line 101. A computer 102 is a server computer that provides the program stored in a recording medium such as a hard disk 103. The communication line 101 may be a communication line for Internet communication, personal computer communication or the like, or it may be a dedicated communication line. The computer 102 reads out the program from the hard disk 103 and transmits the program to the personal computer 100 via the communication line 101. Namely, the program embodied as a data signal on a carrier wave is transmitted via the communication line 101. Thus, the program can be distributed as a computer-readable computer program product adopting any of various modes such as a recording medium and a carrier wave.

While an explanation is given above in reference to the embodiments on an example in which the electronic camera is a video camera exclusively used to photograph or take moving pictures or a digital still camera with which moving pictures can be taken, the present invention is not limited to this example. The present invention may be adopted in a portable telephone equipped with a camera, with which moving pictures can be taken. In other words, the present invention may be adopted in all types of image-capturing apparatuses capable of photographing or taking moving pictures.

It is to be noted that the image processor 4 used in the embodiments described above is capable of functioning as the reference panning speed determining means, the actual panning speed characteristics detection means, the calculation means for calculating the difference between the reference panning speed characteristics and the actual panning speed characteristics and the correction means for executing correction based upon the calculation results according to the present invention. The explanation provided above simply describes examples, and the present invention may be interpreted without being restricted in any way whatsoever to the correspondence between the components of the embodiments and the components according to the present invention.

The above described embodiments are examples, and various modifications can be made without departing from the spirit and scope of the invention.

What is claimed is:

1. A camera with which a moving picture can be taken by panning the camera, comprising:
   a detection unit that detects actual camera panning speed characteristics;
   a calculation unit that calculates a speed characteristics difference between the actual panning speed characteristics and reference panning speed characteristics; and
   a correction unit that executes correction so as to adjust panning speed characteristics of a moving picture to be obtained closer to the reference panning speed characteristics based upon the speed characteristics difference having been calculated, wherein
   the correction unit comprises a cropping unit that crops a part of each frame of the moving picture to create a new frame, and executes a correction so as to adjust panning speed characteristics of a moving picture to be obtained closer to the reference panning speed characteristics by altering a position at which the picture is to be cropped by the cropping unit based on the speed characteristics difference calculated by the calculating unit.

2. The camera according to claim 1, further comprising:
   a determining unit that determines the reference panning speed characteristics.

3. The camera according to claim 1, wherein:
   the detection unit further comprises an extraction unit that extracts a target point within the moving picture and detects the actual panning speed characteristics based upon an extent of a displacement occurring within the moving picture with regard to the target point extracted by the extraction unit.

4. The camera according to claim 3, wherein:
   a position of the target point is calculated based upon a distance from an end of an image-capturing plane.

5. The camera according to claim 1, wherein:
   the cropping position is adjusted by altering a read-out position from which a picture is read out from an image-capturing element.

6. The camera according to claim 1, wherein:
   the reference panning speed characteristics are set as characteristics that demonstrate a specific change over time.

7. The camera according to claim 1, further comprising:
   an image-capturing unit that takes the moving picture, wherein:
   the correction unit further comprises a cropping unit that crops a part of the moving picture; and
   the image-capturing unit captures a wider range of a picture than a range of the moving picture cropped by the cropping unit.

8. A camera that can take a moving picture by panning the camera, comprising:
   a detection unit that detects actual camera panning speed characteristics;
   a calculation unit that calculates a speed characteristics difference between the actual panning speed characteristics and reference panning speed characteristics; and
   a correction unit that executes correction so as to adjust panning speed characteristics of a moving picture to be obtained closer to the reference panning speed characteristics based on the speed characteristics difference calculated by the calculation unit, wherein;
   the detection unit further detects an actual panning direction along which the camera is actually moved;
   the calculation unit further calculates a direction difference between a reference panning direction and the actual panning direction detected by the detection unit; and
   the correction unit executes the correction based upon the direction difference and the speed characteristics difference so as to adjust panning speed characteristics of a moving picture to be obtained along the panning direction closer to the reference panning speed characteristics along the reference panning direction.

9. The camera according to claim 8, further comprising:
   a direction determining unit that determines the reference panning direction.

10. A camera that can take a moving picture by panning the camera, comprising:
    a detection unit that detects actual camera panning speed characteristics;
    a calculation unit that calculates a speed characteristics difference between the actual panning speed characteristics and reference panning speed characteristics; and
    a correction unit that executes correction so as to adjust panning speed characteristics of a moving picture to be obtained closer to the reference panning speed characteristics based on the speed characteristics difference calculated by the calculation unit, wherein;
    the calculation unit calculates an offset extent to which the moving picture becomes offset along a direction perpendicular to the panning direction; and
    the correction unit corrects an offset of the moving picture along the direction perpendicular to the panning direction based upon the calculated offset extent.

11. A storage medium storing a computer-readable computer program used to edit a moving picture taken by panning a camera, with the program comprising:
    detection processing for obtaining the moving picture and detecting actual camera panning speed characteristics based upon the moving picture;
    calculation processing for calculating a speed characteristics difference between the actual panning speed characteristics and reference panning speed characteristics; and
    correction processing for executing correction by cropping a part of each frame of the moving picture to create a new frame based upon the calculated speed characteristics difference so as to adjust panning speed characteristics of the obtained moving picture to be obtained closer to the reference panning speed characteristics.

12. An picture editing method through which a moving picture taken by panning a camera is edited, comprising:
    obtaining the moving picture taken by panning the camera;
    calculating a speed characteristics difference between actual camera panning speed characteristics and reference panning speed characteristics based upon the moving picture having been obtained; and
    correcting panning speed characteristics of the obtained moving picture by cropping a part of each frame of the moving picture to create a new frame based upon the calculated speed characteristics difference so as to adjust the panning speed characteristics of the obtained moving picture closer to the reference panning speed characteristics.

13. A camera that can take a moving picture by panning the camera, comprising:
    a detection unit that detects actual camera panning speed characteristics and an actual panning direction along which the camera is actually moved;
    a calculation unit that calculates an offset extent to which the moving picture becomes offset along a panning direction and an offset extent to which the moving picture becomes offset along a direction perpendicular to the reference panning direction based upon the reference panning direction, the actual camera panning speed characteristics and the actual panning direction; and a correction unit that executes correction so as to adjust panning speed characteristics along a panning direction of a moving picture to be obtained closer to the reference panning speed characteristics along the reference panning direction and corrects an offset of the moving picture along a direction perpendicular to the panning direction, based upon calculation results by the calculation unit.

* * * * *